United States Patent
Obata

(10) Patent No.: US 9,440,585 B2
(45) Date of Patent: Sep. 13, 2016

(54) OPTICAL AXIS ASCERTAINING DEVICE FOR IN-VEHICLE CAMERA

(75) Inventor: Yujiro Obata, Inuyama (JP)

(73) Assignee: TOYOYA JIDOSHA KABUSHIKI KAISHA, Toyota-Shi (JP)

( * ) Notice: Subject to any disclaimer, the term of this patent is extended or adjusted under 35 U.S.C. 154(b) by 247 days.

(21) Appl. No.: 14/344,504

(22) PCT Filed: Sep. 13, 2011

(86) PCT No.: PCT/JP2011/070878
§ 371 (c)(1),
(2), (4) Date: Mar. 12, 2014

(87) PCT Pub. No.: WO2013/038506
PCT Pub. Date: Mar. 21, 2013

(65) Prior Publication Data
US 2014/0340521 A1 Nov. 20, 2014

(51) Int. Cl.
*B60R 1/00* (2006.01)
*H04N 7/18* (2006.01)
*G08G 1/16* (2006.01)

(52) U.S. Cl.
CPC .......... *B60R 1/00* (2013.01); *G08G 1/165* (2013.01); *H04N 7/183* (2013.01); *B60R 2300/302* (2013.01); *B60R 2300/304* (2013.01); *B60R 2300/305* (2013.01); *B60R 2300/802* (2013.01); *B60R 2300/806* (2013.01); *B60R 2300/8066* (2013.01)

(58) Field of Classification Search
None
See application file for complete search history.

(56) References Cited

U.S. PATENT DOCUMENTS

2011/0069169 A1* 3/2011 Kadowaki ............... B60R 1/00
348/148

FOREIGN PATENT DOCUMENTS

| JP | 10119672 A | 5/1998 |
| JP | 2004001658 A | 1/2004 |
| JP | 2005077107 A | 3/2005 |
| JP | 2006074329 A | 3/2006 |

* cited by examiner

*Primary Examiner* — Kate Luo
(74) *Attorney, Agent, or Firm* — Kenyon & Kenyon LLP

(57) ABSTRACT

The present invention aims to provide an optical axis ascertaining device for an in-vehicle camera which can simply adjust and correct the optical axis of the camera. This device comprises image processing device (image recognition portion and tracking portion) detecting a static obstacle (for example, wheel stopper disposed on ground surface) from an image acquired by rear camera through image recognition and tracking the static obstacle and rear wheel rotation sensor as a sensor detecting a movement distance of a vehicle, for example; and ascertains the optical axis direction of the camera, based on an attachment position of the camera and the movement distance of the vehicle from where a static object being tracked is out of an image capturable region of the rear camera due to an approach of the vehicle to where the vehicle comes into contact with the static object.

7 Claims, 7 Drawing Sheets

OPTICAL AXIS ASCERTAINING DEVICE FOR IN-VEHICLE CAMERA

CROSS-REFERENCE TO RELATED APPLICATION

This is a national phase application based on the PCT International Patent Application No. PCT/JP2011/070878 filed on Sep. 13, 2011, the entire contents of which are incorporated herein by reference.

TECHNICAL FIELD

The present invention relates to an adjustment of an optical axis in an in-vehicle camera that is mounted on a vehicle and used to detect an obstacle, check a rear view, and the like.

BACKGROUND ART

There is a known technology of performing controlling a vehicle and providing information to a driver based on video image information which is acquired from a camera mounted on the vehicle. As this type of technology, for example, there are a technology of detecting white line information that is a boundary of a traveling lane in which a host vehicle travels from an image and using the white line information for determining a deviation of the vehicle, and a technology of inducing and guiding a path to reach a target position by setting the target position for parking based on the image.

In such a technology, a coordinate transformation is utilized from a position of a subject in the image acquired through an in-vehicle camera to a position of the subject with respect to the vehicle. In order to accurately ascertain the position of the subject with respect to the vehicle during this coordinate transformation, there is a need to accurately ascertain an attachment position and an orientation (optical axis direction) of the in-vehicle camera.

A technology disclosed in Patent Literature 1 is an example of such a technology of adjusting the optical axis direction, and there are provided a projection portion that projects a mark to a screen which is placed in an arbitrary position in front of the vehicle, and a distance measurement portion that measures a distance to the screen, thereby projecting the mark, based on information of an optical axis center line which is individually set for every vehicle and the distance to the screen, to a position on the optical axis center line on the screen and performing adjusting the optical axis based thereon.

CITATION LIST

Patent Literature

[Patent Literature 1] Japanese Patent Application Laid-Open Publication No. 2006-74329

SUMMARY OF INVENTION

Technical Problem

However, in this technology, it is necessary to dispose a screen at a distance away to a certain extent with respect to a vehicle and to perform adjusting, thereby requiring an extensive space. Moreover, it is necessary to appropriately control a disposed position of the screen and a projection portion themselves when adjusting, and thus, it is difficult to perform the adjusting at a place other than a factory or a repair shop.

Therefore, the present invention aims to provide an optical axis ascertaining device for an in-vehicle camera which can simply perform the adjusting and correcting of the optical axis of the in-vehicle camera.

Solution to Problem

In order to solve the problem described above, an optical axis ascertaining device for an in-vehicle camera according to the present invention is the optical axis ascertaining device that ascertains an optical axis direction of the in-vehicle camera and comprises obstacle tracking means for tracking an obstacle by detecting the obstacle from an image captured by the in-vehicle camera; movement distance detection means for detecting a movement distance of a vehicle; and ascertaining means for ascertaining the optical axis direction of the in-vehicle camera based on the movement distance of the vehicle from where a static object being tracked using the obstacle tracking means is out of an image capturable region of the in-vehicle camera due to an approach of the vehicle to where the vehicle comes into contact with the static object detected by the movement distance detection means, and an attachment position of the in-vehicle camera.

The optical axis direction of the camera may be adjusted automatically or manually based on the ascertained optical axis direction. However, the adjusting may be replaced by correcting a display image or an image to be overlapped with this image based on the ascertained optical axis direction. The static object may be a wheel stopper installed on a ground surface.

Advantageous Effects of Invention

A range capable of image-capturing using an in-vehicle camera is determined by an angle of view of the in-vehicle camera and an optical axis direction thereof. Therefore, if a movement distance of a vehicle from where an obstacle positioned within an image capturable region is out of the image capturable region of the camera due to a movement of the vehicle toward an obstacle direction to where the vehicle (for example, tire) comes into contact with the obstacle is detected, this movement distance corresponds to a distance from a contact position between the obstacle and the vehicle to a side with the boundary closest to the vehicle among the boundaries of image capturable region of the camera. This position, an attachment condition of the camera and a specification of the camera (angle of view) allow the optical axis direction of the camera to be accurately ascertained.

It is possible to simply obtain the similar effect as adjusting the optical axis direction by performing a correction of a display based on the ascertained optical axis direction. The optical axis direction can be easily and reliably ascertained by using a wheel stopper.

DESCRIPTION OF EMBODIMENTS

Figure 1:
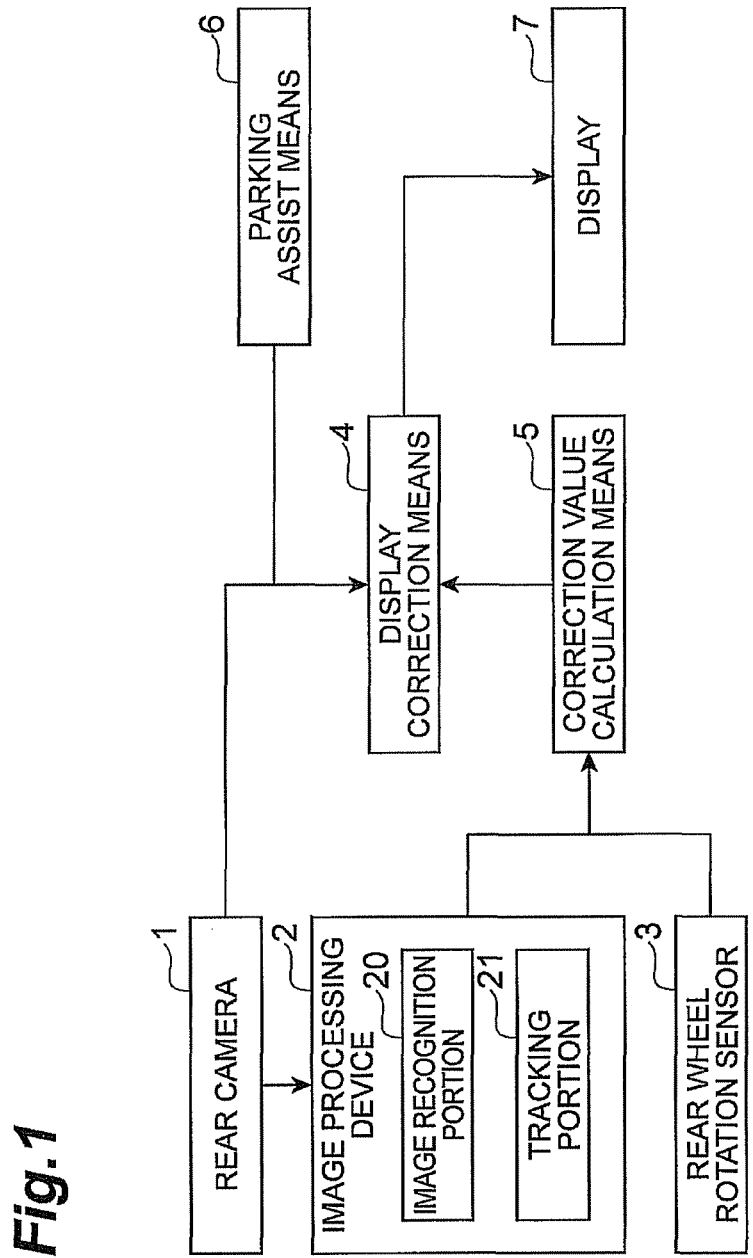
FIG. 1 is a block configuration diagram of an optical axis ascertaining device according to the present invention.

Hereinafter, a suitable embodiment according to the present invention will be described in detail with reference to the accompanying drawings. In order to facilitate the understanding of the description, the same reference numerals are applied to the same configuration elements as far as possible, thereby omitting repeated description.

There is provided a block configuration diagram of a parking assist device including an embodiment of an optical axis ascertaining device according to the present invention. Here, a case in which an image acquired by an in-vehicle camera is applied to an operation in a parking assist is exemplified for the description. However, the present invention can be applied to a case where the captured image using the in-vehicle camera is used for other assists for the driver such as lane recognition, obstacle detection, contact evasion and the like as well, for example. In this parking assist device, an image of a target parking position calculated by parking assist means 6 overlaps an image acquired through a rear camera 1 which is disposed in the rear of the vehicle to be displayed on a display 7 which is disposed inside the vehicle, thereby assisting the parking operation for a driver.

This parking assist device comprises an image processing device 2 processing the image acquired through the rear camera 1, a rear wheel rotation sensor 3 functioning as movement distance calculation means for detecting a movement distance of the vehicle by detecting rotations of a rear wheel, display correction means 4 for correcting a display position of the image displayed on the display 7, and a correction value calculation means 5 (serving as ascertaining means for ascertaining an optical axis direction of the rear camera 1) for calculating a correction value of a display correction by the display correction means 4, in addition to the rear camera 1, the parking assist means 6 and the display 7. Moreover, the image processing device 2 comprises an image recognition portion 20 and a tracking portion 21 therein. The image recognition portion 20 and the tracking portion 21 correspond to obstacle tracking means in the present invention. Here, a case where a wheel stopper disposed on a ground surface as a static obstacle is used will be exemplified for the description.

All the image processing device 2, the display correction means 4, the correction value calculation means 5 and the parking assist means 6 are configured of a central processing unit (CPU), a read only memory (ROM), a random access memory (RAM) and the like. However, a plurality of devices or types of means may partially or entirely share hardware. In addition, when each device or type of means is realized by software, the software is not necessarily independent from each other. Each device or type of means may partially share a program or may be realized within one program.

The display 7 is not necessarily a dedicated display. The display 7 may be shared with a display device of an audio visual system or a navigation system. As the rear wheel rotation sensor 3, a sensor in a type used as a wheel speed sensor emitting a predetermined number of pulse signals at one rotation in response to a rotation of the rear wheel may be used.

It is preferable that the rear camera 1 be able to use a camera in a type outputting an image of a predetermined number of pixels at a predetermined frame rate (for example, TV frame rate) as a dynamic image and output digital data to the image processing device 2. If an output of the rear camera 1 is an analog signal, an AD converter may be provided with respect to the image processing device 2 or an AD converting function may be provided on the image processing device 2 side.

Figure 2:
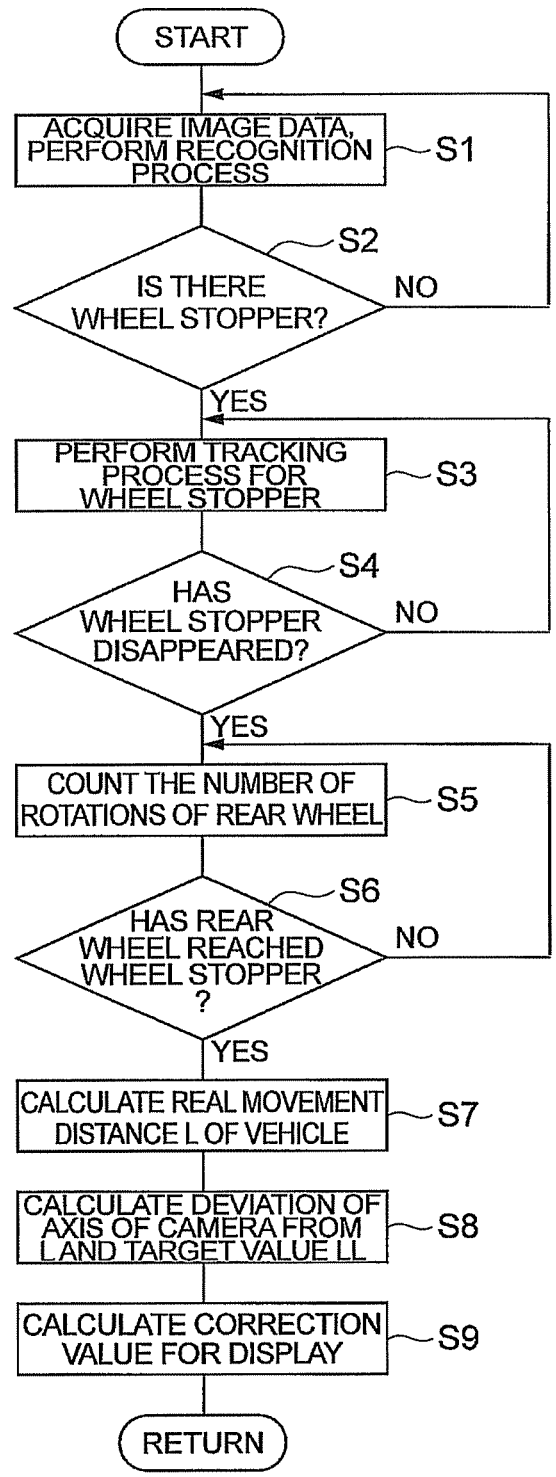
FIG. 2 is a flow chart illustrating a process of ascertaining an optical axis direction in the device of FIG. 1.
Figure 4:
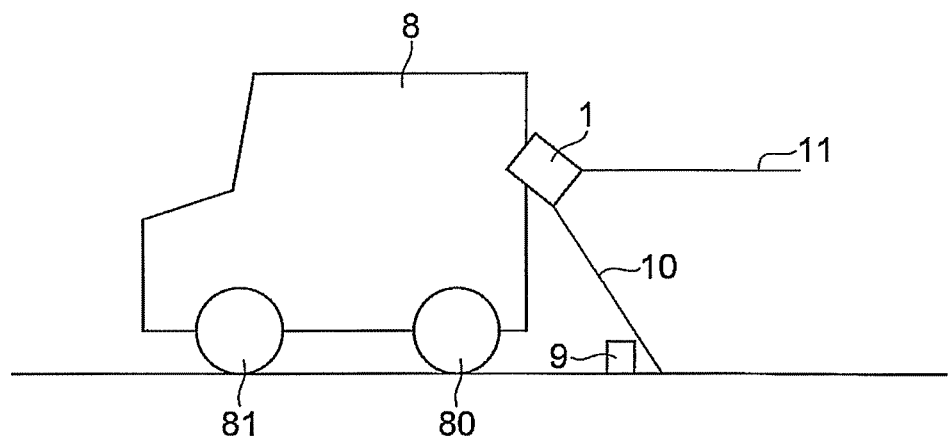
FIG. 4 is a view illustrating another positional relationship between the wheel stopper and the vehicle when the vehicle moves backward from the state of FIG. 3.
Figure 5:
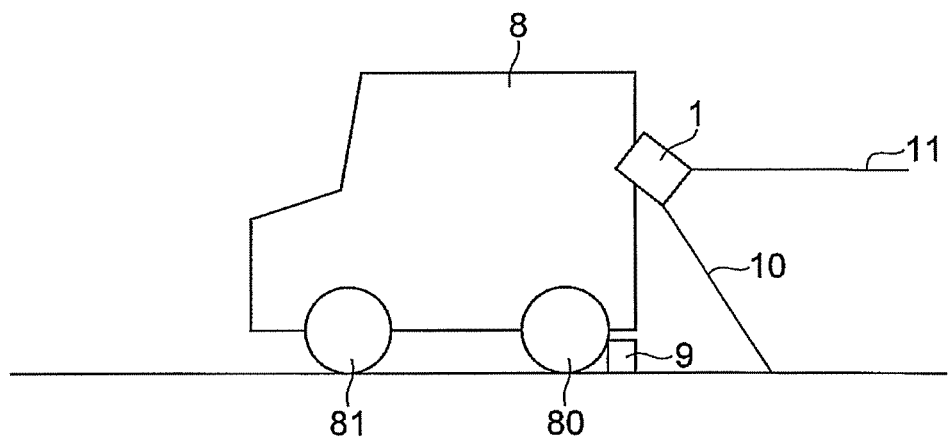
FIG. 5 is a view illustrating still another positional relationship between the wheel stopper and the vehicle when the vehicle reaches the wheel stopper from the state of FIG. 4.
Figure 6:
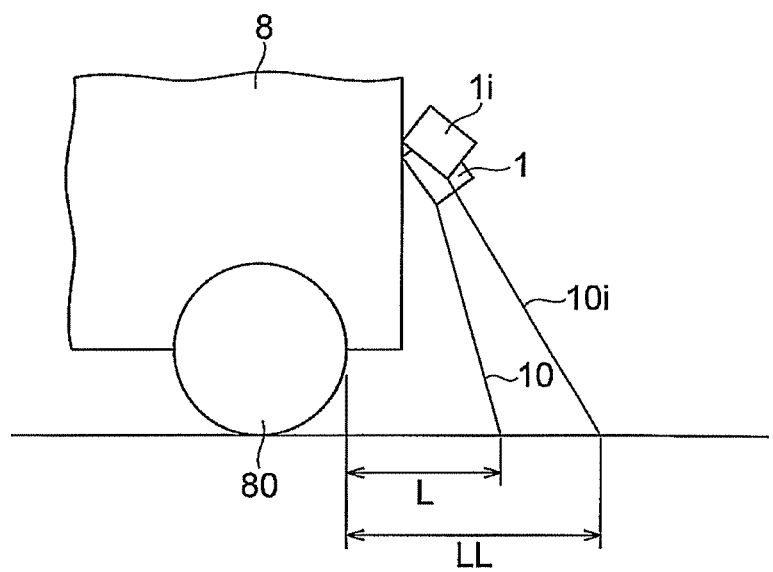
FIG. 6 is a view describing ascertaining of deviation of an optical axis through the process of FIG. 2.

Next, a process of ascertaining deviation of an optical axis using this device will be described with reference to FIGS. 2 to 6. FIG. 2 is a flow chart illustrating the process of ascertaining the optical axis direction in the device of FIG. 1 and FIGS. 3 to 5 are views illustrating positional relationships between the wheel stopper and the vehicle during this process. In addition, FIG. 6 is a view describing ascertaining the deviation of the optical axis through this process.

This ascertaining process is performed mainly by the correction value calculation means 5 and the image processing device 2. As an optical axis correction process is turned on by input means not illustrated, (for example, touch panel integrated with display 7), the ascertaining process is performed when the vehicle is set in a state of moving backward.

Figure 3:
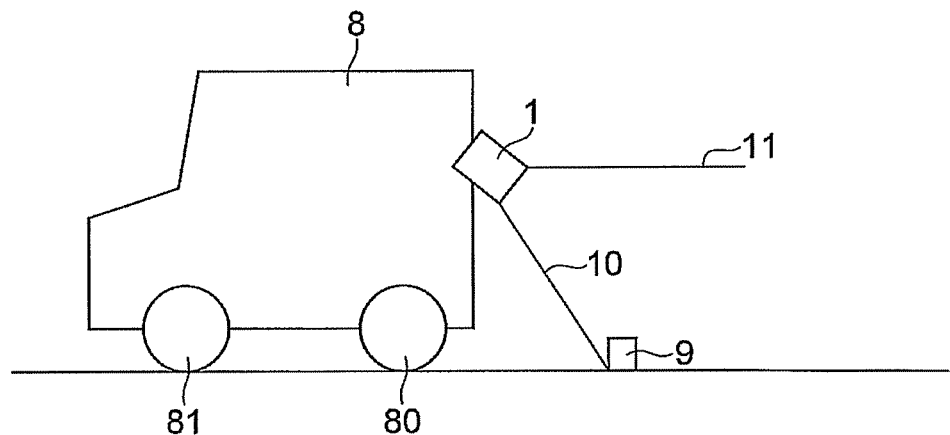
FIG. 3 is a view illustrating a positional relationship between a wheel stopper and a vehicle in an initial stage during a process of FIG. 2.

First, the image recognition portion 20 of the image processing device 2 acquires image data from the rear camera 1 and performs a recognition process (Step S1). Here, a case of using a wheel stopper 9 as a recognition subject will be exemplified for the description as illustrated in FIGS. 3 to 5. The recognition process of the wheel stopper 9 is performed by recognizing a substantially rectangular parallelepiped object which is disposed on the ground surface in a laterally long manner through a pattern matching method and the like.

Next, it is determined whether or not the recognition is successful (Step S2). When the wheel stopper 9 can be recognized, the process moves to Step S3, and when the wheel stopper 9 cannot be recognized, the process returns to Step S1. When a certain period of time has elapsed without recognizing the wheel stopper 9, the process may be regarded as recognition failure to be terminated or verification may be requested of the driver.

In Step S3, the tracking portion 21 performs a tracking process of the wheel stopper 9 based on information of the wheel stopper 9 recognized through the image recognition portion 20. This tracking process is performed by acquiring each frame image from the rear camera 1, recognizing the wheel stopper 9 through the image recognition portion 20, acquiring positional information within an image of the recognized wheel stopper 9 and tracking this in chronological order. This tracking process is performed as a vehicle 8 approaches the wheel stopper 9 until the wheel stopper 9 disappears from an inside of a screen (Step S4). As illustrated in FIG. 3, in a state where the wheel stopper 9 is displayed in the image first acquired through the rear camera 1, the wheel stopper 9 is positioned between angle of view boundary lines 10 and 11 of the rear camera 1. From this state, if the vehicle 8 continues to move backward to approach the wheel stopper 9, as illustrated in FIG. 4, the wheel stopper 9 is positioned on a vehicle side from the angle of view boundary line 10 of the vehicle side (front side when seen from the vehicle 8 or lower side), and thus, the wheel stopper 9 is out of an image capturable region interposed between the angle of view boundary lines 10 and 11. In this manner, the wheel stopper 9 is determined to disappear at the moment when the wheel stopper 9 is out of the image capturable region of the rear camera 1 and is not displayed, and thereby the process moves to Step S5.

In Steps S5 and S6, based on an output of the rear wheel rotation sensor 3, the number of rotations of a rear wheel 80 are counted, from when the wheel stopper 9 disappears from the screen, to when the rear wheel 80 reaches the position of the wheel stopper 9 (refer to FIG. 5).

In Step S7, a movement distance L of the vehicle 8 is calculated, from where the wheel stopper 9 is out of the image capturable region of the rear camera 1, to where the rear wheel 80 reaches the wheel stopper 9, based on the counted number of rotations of the rear wheel 80 and a radius of a tire known from the specification of the vehicle 8.

In following Step S8, the deviation of the optical axis of the rear camera 1 is computed based on attachment positional information of the rear camera 1 and a difference between the movement distance L of the vehicle 8 and a target movement distance LL in a case where the rear camera 1 is disposed in the optical axis direction as designed. As illustrated in FIG. 6, the reference sign LL denotes a distance between an angle of view boundary line $10i$ on the vehicle side of a rear camera $1i$ in a designed position and a contact position of the rear wheel 80 and the wheel stopper 9, and the reference sign L denotes a distance between the real angle of view boundary line 10 on the vehicle side of the rear camera 1 and the contact position of the rear wheel 80 and the wheel stopper 9. In a case where the distances LL and L substantially match each other, there is no deviation of the optical axis. In a case where the distance L is longer than the distance LL, the optical axis of the rear camera 1 is deviated toward a direction away from the vehicle from the designed position. In contrast, in a case where the distance L is shorter than the distance LL, the optical axis of the rear camera 1 is deviated toward the vehicle side from the designed position.

If tilts of the angle of view boundary lines 10 and $10i$ of the rear cameras 1 and $1i$ with respect to a vertical direction are respectively set to $\theta$ and $\theta i$, and a height of attachment of the camera is set to h, the following is satisfied. (In this case, it is considered that the angle of view boundary lines 10 and $10i$ meet at the height of the attachment of the camera.)

$$LL-L=h(\tan \theta i - \tan \theta)$$

It is possible to compute $(\theta i - \theta)$ which is an amount of the deviation in the optical axis direction from this expression.

In Step S9, the correction value calculation means 5 calculates an appropriate amount of correction in the display correction means 4 based on the computed deviation of the optical axis, thereby terminating the process.

When overlapping the display image transmitted from the parking assist means 6 with a video image acquired through the rear camera 1 based on the acquired amount of correction, the display correction means 4 corrects the deviation of the optical axis and displays the same on the display 7 by correcting either of the video images or both of the display position.

Figure 7:
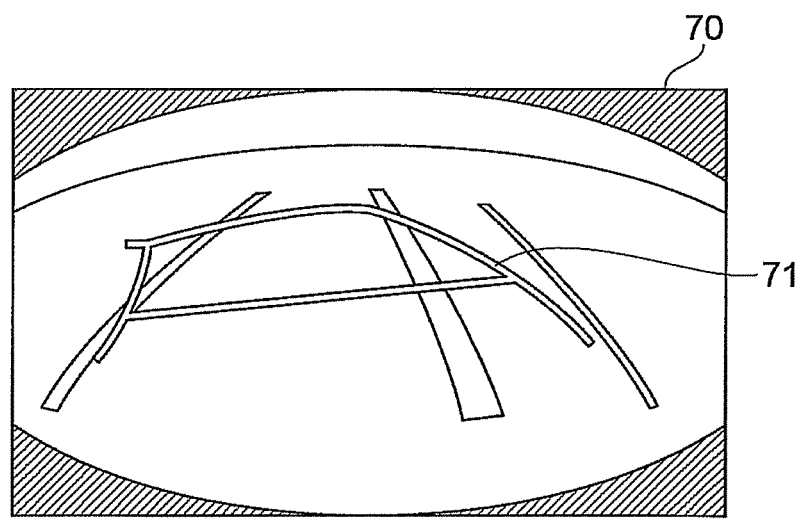
FIG. 7 is an example of an image displayed on the device of FIG. 1.

FIG. 7 is an example of the displayed image thereof. A target parking position frame 71 is displayed in a display image 70 of the display 7 when the vehicle moves backward as maintaining a present steering angle. In a case where the optical axis direction of the rear camera 1 is deviated in the vehicle direction as illustrated in FIG. 6, since the display image 70 is deviated to a side close to the vehicle from the designed position, the original target parking position frame 71 is deviated to a side away from the vehicle from a position to be displayed. Therefore, if the driver sets the steering angle and performs a parking operation in accordance with the parking assist so as to cause the target parking position frame 71 to correspond to a parking lot on this screen, there is a possibility that the vehicle may fail to reach the target parking position frame 71. According to the present invention, in this case, since the correction of the display position of the target parking position frame 71 is performed to correspond to the real image, it is possible to reliably induce the vehicle to the displayed target parking position.

In the description above, the example of correction of displaying on the display is described. However, the calculated deviation of the optical axis may be used for adjusting the optical axis position of the camera. The adjustment for the optical axis position may be set to be automatically adjusted by attaching the rear camera 1 to the vehicle through a motor, for example, or may be set to be manually adjusted by displaying a guidance on the display and the like based thereon.

In addition, the present invention is not limited to the adjustment of the rear camera 1. It is possible to apply the invention to ascertaining and adjusting the optical axis another camera such as a front camera. In addition, an object used in ascertaining the optical axis is not limited to the wheel stopper, and another static object may be adopted. In this case, the static object may be anything as long as the object can determine contact with the vehicle. A contact point with respect to the vehicle is not limited to the tire, and a bumper or a vehicle body may be used.

REFERENCE SIGNS LIST

1, $1i$ . . . rear camera, 2 . . . image processing device, 3 . . . rear wheel rotation sensor, 4 . . . display correction means, 5 . . . correction value calculation means, 6 . . . parking assist means, 7 . . . display, 8 . . . vehicle, 9 . . . wheel stopper, 10, $10i$, 11 . . . angle of view boundary line, 20 . . . image recognition portion, 21 . . . tracking portion, 70 . . . display image, 71 . . . target parking position frame, 80 . . . rear wheel

The invention claimed is:
1. An optical axis ascertaining device for an in-vehicle camera which ascertains an optical axis direction of the in-vehicle camera comprising:
   an image recognition portion and a tracking portion configured to track an obstacle by detecting the obstacle from an image captured by the in-vehicle camera;
   a rear wheel rotation sensor configured to detect a movement distance of a vehicle; and
   an electronic control unit including a CPU, ROM, and RAM, the electronic control unit configured to ascertain the optical axis direction of the in-vehicle camera based on
      the movement distance of the vehicle
         from where a static object being tracked using the image recognition portion and the tracking portion is out of an image capturable region of the in-vehicle camera due to an approach of the vehicle
         to where the vehicle comes into contact with the static object detected by the rear wheel rotation sensor and
      an attachment position of the in-vehicle camera.

2. The optical axis ascertaining device for an in-vehicle camera according to claim 1, wherein the electronic control unit is further configured to:
  correct a display position of the image captured by the in-vehicle camera or an image to be displayed as being overlapped with the image based on the optical axis direction ascertained by the electronic control unit.

3. The optical axis ascertaining device for an in-vehicle camera according to claim 1,
  wherein the static object is a wheel stopper which is installed on a ground surface.

4. An optical axis ascertaining device for an in-vehicle camera which ascertains an optical axis direction of the in-vehicle camera comprising:
  an image recognition portion and a tracking portion configured to track an obstacle by detecting the obstacle from an image captured by the in-vehicle camera;
  a wheel rotation sensor configured to detect a movement distance of a vehicle; and
  an electronic control unit including a CPU, ROM, and RAM, the electronic control unit configured to ascertain the optical axis direction of the in-vehicle camera based on
    the movement distance of the vehicle
      from where a static object being tracked using the image recognition portion and the tracking portion is out of an image capturable region of the in-vehicle camera due to an approach of the vehicle
      to where the vehicle comes into contact with the static object detected by the wheel rotation sensor and
    an attachment position of the in-vehicle camera.

5. The optical axis ascertaining device for an in-vehicle camera according to claim 4, wherein the electronic control unit is further configured to:
  correct a display position of the image captured by the in-vehicle camera or an image to be displayed as being overlapped with the image based on the optical axis direction ascertained by the electronic control unit.

6. The optical axis ascertaining device for an in-vehicle camera according to claim 4,
  wherein the static object is a wheel stopper which is installed on a ground surface.

7. The optical axis ascertaining device for an in-vehicle camera according to claim 5,
  wherein the static object is a wheel stopper which is installed on a ground surface.

* * * * *